(12) United States Patent
Ishijima et al.

(10) Patent No.: US 7,568,977 B2
(45) Date of Patent: Aug. 4, 2009

(54) SHAFT FOR CONSTANT VELOCITY UNIVERSAL JOINT

(75) Inventors: Minoru Ishijima, Iwata (JP); Kenta Yamazaki, Iwata (JP)

(73) Assignee: NTN Corporation, Osaka-Fu (JP)

( * ) Notice: Subject to any disclaimer, the term of this patent is extended or adjusted under 35 U.S.C. 154(b) by 235 days.

(21) Appl. No.: 11/501,101

(22) Filed: Aug. 9, 2006

(65) Prior Publication Data

US 2007/0049382 A1    Mar. 1, 2007

(30) Foreign Application Priority Data

Aug. 30, 2005    (JP)    ............... 2005-250161
Aug. 30, 2005    (JP)    ............... 2005-250172

(51) Int. Cl.
    *F16D 3/223*    (2006.01)
(52) U.S. Cl. ...................... 464/145; 464/906
(58) Field of Classification Search ......... 464/144–146, 464/182, 905–906; 148/572, 902
    See application file for complete search history.

(56) References Cited

U.S. PATENT DOCUMENTS

| 5,018,899 | A  | * | 5/1991  | Kuribara et al. ............ 464/134 |
| 6,652,385 | B2 | * | 11/2003 | Kadota et al. .............. 464/145 |
| 6,673,167 | B2 | * | 1/2004  | Yoshida et al. ............. 148/328 |

| 2002/0017343 | A1 |   | 2/2002  | Yoshida et al. |
| 2003/0083135 | A1 | * | 5/2003  | Yamazaki et al. .......... 464/145 |
| 2006/0223641 | A1 | * | 10/2006 | Sekine ....................... 464/89 |

FOREIGN PATENT DOCUMENTS

| EP | 1 637 433 A1 | 3/2006 |
| EP | 1 645 764 A1 | 4/2006 |
| JP | 2005-226781  | 8/2005 |
| WO | 2005/078299  | 8/2005 |

\* cited by examiner

*Primary Examiner*—Greg Binda
*Assistant Examiner*—Clifford J Louden
(74) *Attorney, Agent, or Firm*—Wenderoth, Lind & Ponack, L.L.P.

(57) ABSTRACT

A constant velocity universal joint shaft, capable of suppressing a rotational backlash when incorporated in the constant velocity universal joint, and improving the assembly efficiency as well as reducing the manufacturing cost. A constant velocity universal joint shaft has a spline that fits an inner race of the constant velocity universal joint. The shaft includes a shaft body with a spline formed thereon, and a yoke portion with a ring-shaped fitting portion. The shaft body and the yoke portion are integrally formed of medium carbon steel. By a pressing force of a pressing member the fitting portion of the yoke portion is tightened, so that such fitting portion fits a shaft external to the joint. In the constant velocity universal joint, the pressing member and an abutment member are elastically butted via an elastic member, so that a ball constantly remains in contact with a raceway of an outer member and a raceway of an inner member.

3 Claims, 6 Drawing Sheets

SHAFT FOR CONSTANT VELOCITY UNIVERSAL JOINT

TECHNICAL FIELD

The present invention relates to a shaft for a constant velocity universal joint, and more particularly to a shaft for a constant velocity universal joint incorporated in a steering apparatus of a vehicle.

BACKGROUND OF THE INVENTION

Constant velocity universal joints are broadly classified into fixed types that only permit an angular displacement between an input shaft and an output shaft, and sliding types that permit both an angular displacement and an axial displacement. The model of the constant velocity universal joint is selected according to the purpose and conditions of use of the respective cases.

FIG. 5 shows an example of a fixed-type constant velocity universal joint (hereinafter, simply "joint 101"). Based on the joint 101 as an example, a conventional constant velocity universal joint will be described. The joint 101 mainly includes an outer member 106 with a plurality of raceways 105 formed an a spherical inner surface (inner diametral surface) 103 of a cup portion 104, an inner member 110 including an inner race 109 with a plurality of raceways 108 formed on a spherical outer surface (outer diametral surface) 107 and a shaft 102, a plurality of balls 111 disposed between the raceways 105, 108, and a retainer 113 with a plurality of ball pockets 112 circumferentially aligned at a predetermined interval for retaining each of the balls 111 (for example found in JP-A No. 2003-130082).

FIG. 6 shows the joints 101 applied to a steering apparatus 71 of a vehicle. The steering apparatus 71 includes the joints 101 between an input shaft 73 connected to a steering wheel 72 and a steering gear 74, so as to transmit a rotational torque exerted by the steering wheel 72 to the steering gear 74, with an operational angle between the input shaft 73 and the steering gear 74. The steering apparatus 71 may be an electrical power steering apparatus (EPS) that provides auxiliary power via a motor, or a hydraulic power steering apparatus that provides auxiliary power via a hydraulic pressure.

In FIG. 6, numerals 50a to 50c designate yokes serving as connecting members. The yoke 50a connects a shaft 115 of the outer member 106 extending from the joint 101A disposed closer to the steering wheel 72, and the shaft 102 of the inner member 110 extending from the joint 101B disposed closer to the steering gear 74, so as to transmit the torque.

The yoke 50b connects the input shaft 73 and the shaft 102 of the inner member 110 extending form the joint 101A closer to the steering wheel 72, so as to transmit the torque.

The yoke 50c connects the shaft 115 of the outer member 106 extending from the joint 101B closer to the steering gear 74 and the steering gear 74, so as to transmit the torque.

Such yokes 50a to 50c and other connecting members that connect the joint 101 and a shaft external to the joint are formed separately from the outer member 106, the inner member 110 and so on, to be attachable thereto so as to transmit the torque, from the viewpoint of convenience in processing and flexibility in changing design specifications.

Conventionally, as described above, the shaft 102 of the inner member 110 and the yoke 50 serving as the connecting member are separately manufactured and then coupled. More specifically, the shaft 102 is fitted to the yoke 50 via a torque transmission unit such as a spline so as to transmit the torque, and the shaft 102 and the yoke 50 are fixed to each other by press-fitting, welding, bonding or fastening with bolts.

Regarding the steering apparatus 71, it is necessary to address the issue of how to prevent a rotational backlash in order to precisely transmit the rotation of the steering wheel 72 to the steering gear 74. When applied to a use where rotational backlash is undesired, it is necessary to prevent rotational backlash between the inner member 110 and so on of the joint 101 and the yoke 50.

When the yoke 50 is press-fitted to the inner member 110 and so on, the mutual interface in the torque transmission unit serves as an interference fit, which restricts the rotational backlash between those members with only the torque transmission unit.

Increasing the interference, however, leads to degraded assembly work efficiency because an enormous pressing load is required for fitting the members. That is where the difficulty lies in controlling the mutual interference of the torque transmission unit to be within an appropriate range.

On the other hand, when the inner member 110 or the like and the yoke 50 are fixed by welding, although the rotational backlash does not emerge between the members, the welded portion is exposed to high temperature, which incurs distortion that may lead to degradation in precision or a crack inside the joint, thereby lowering the yield of the joint 101. In addition, when the inner member 110 and the yoke 50 are fixed by bonding, secular deterioration of the adhesive may incur an increase in a gap in a rotation direction between the members of the torque transmission unit, thus provoking the rotational backlash.

SUMMARY OF THE INVENTION

The present invention has been conceived in view of the foregoing situation, with an object to provide a shaft for a constant velocity universal joint capable of suppressing rotational backlash when incorporated in a constant velocity universal joint, and improving the assembly efficiency as well as reducing the manufacturing cost.

To achieve this object, the present invention provides a constant velocity universal joint shaft, having a spline that fits an inner race of the constant velocity universal joint, comprising a shaft body an which the spline is provided; a yoke portion including a ring-shaped fitting portion, wherein the shaft body and the yoke portion are integrally formed of a medium carbon steel, and a diameter of the fitting portion of the yoke portion is reduced by a fastening force of a fastening member, so that the fitting portion fits a shaft external to the joint.

The shaft body and the yoke portion that fits a shaft external to the joint are integrally formed, which eliminates the need to separately fabricate the shaft and the yoke to subsequently couple them. Also, employing a medium carbon steel to form the yoke portion permits reducing the diameter (fastening deformation) of the fitting portion of the yoke portion.

Also, the shaft body includes a minor diameter portion that serves to avoid interference with an outer member of the constant velocity universal joint, and the minor diameter portion is subjected to an induction hardening process. Performing the induction hardening on the minor diameter portion of the shaft body upgrades the strength thereof even though the minor diameter portion is originally inferior in strength, thereby securing a sufficient strength required by the shaft, and further allowing the shaft body to be oriented at a larger operational angle because of the minor diameter portion.

The spline portion may be subjected to induction hardening, or the spline portion, the minor diameter portion, and tapered portions on the respective end portions of the minor diameter portion may be subjected to induction hardening.

When a depth of the hardened layer formed on the minor diameter portion of the shaft body by the induction hardening (effective depth of the hardened layer) is denoted by γ, and a diameter of the minor diameter portion by d, it is preferable that $d/4 \leq \gamma \leq d/2$ is satisfied. Such processing allows securing a stable strength of the minor diameter portion.

Also, performing the induction hardening on a yoke portion-side region in the spline portion of the shaft body allows securing the strength of the spline-fitted portion.

In particular, when the hardened layer depth of a base portion of the spline portion is denoted by γl, and a diameter of the base portion of the spline by dl, it is preferable that $dl/4 \leq \gamma l \leq dl/2$ is satisfied. Such processing allows securing a stable strength of the spline-fitted portion.

It is preferable that the constant velocity universal joint includes an outer member with a plurality of raceways formed on an inner diametral surface thereof; an inner member including an inner race with a plurality of raceways formed on an outer diametral surface thereof; a ball located in each of a plurality of ball tracks formed by collaboration of the raceway of the outer member and the raceway of the inner member; a retainer disposed between the outer member and the inner member so as to retain each ball; and a pressing member attached to the shaft body and an abutment member attached to the retainer may be elastically abutted via an elastic member, so that each ball constantly remains in contact with the raceway of the outer member and the raceway of the inner member.

Such structure causes the ball to constantly remain in contact with the raceway of the outer member and the raceway of the inner member. Accordingly, a gap between the tracks (axial gap) can be eliminated via the ball. Also, a circumferential play (rotational backlash) between the inner race and the outer race (outer member) can be prevented.

Thus, according to the present invention, the shaft body and the yoke portion that fits a shaft external to the joint are integrally formed, which eliminates the need to separately fabricate the shaft and the yoke and to subsequently couple them. Such a structure allows improvement of the assembly efficiency of the constant velocity universal joint, as well as reduction of the manufacturing cost. Further, since the shaft body and the yoke portion are integrally formed, there is no likelihood of separation of the shaft body and the yoke portion, unlike the conventional coupled structure, and a stable strength is achieved. Moreover, the rotational backlash originating from the conventional coupled structure of the yoke portion can be eliminated. The shaft, therefore, can be appropriately applied to a steering apparatus of a vehicle, in which rotational backlash should not occur.

DETAILED DESCRIPTION OF THE INVENTION

Referring to FIGS. 1 through 4, embodiments of the present invention will be described hereunder.

Figure 1:
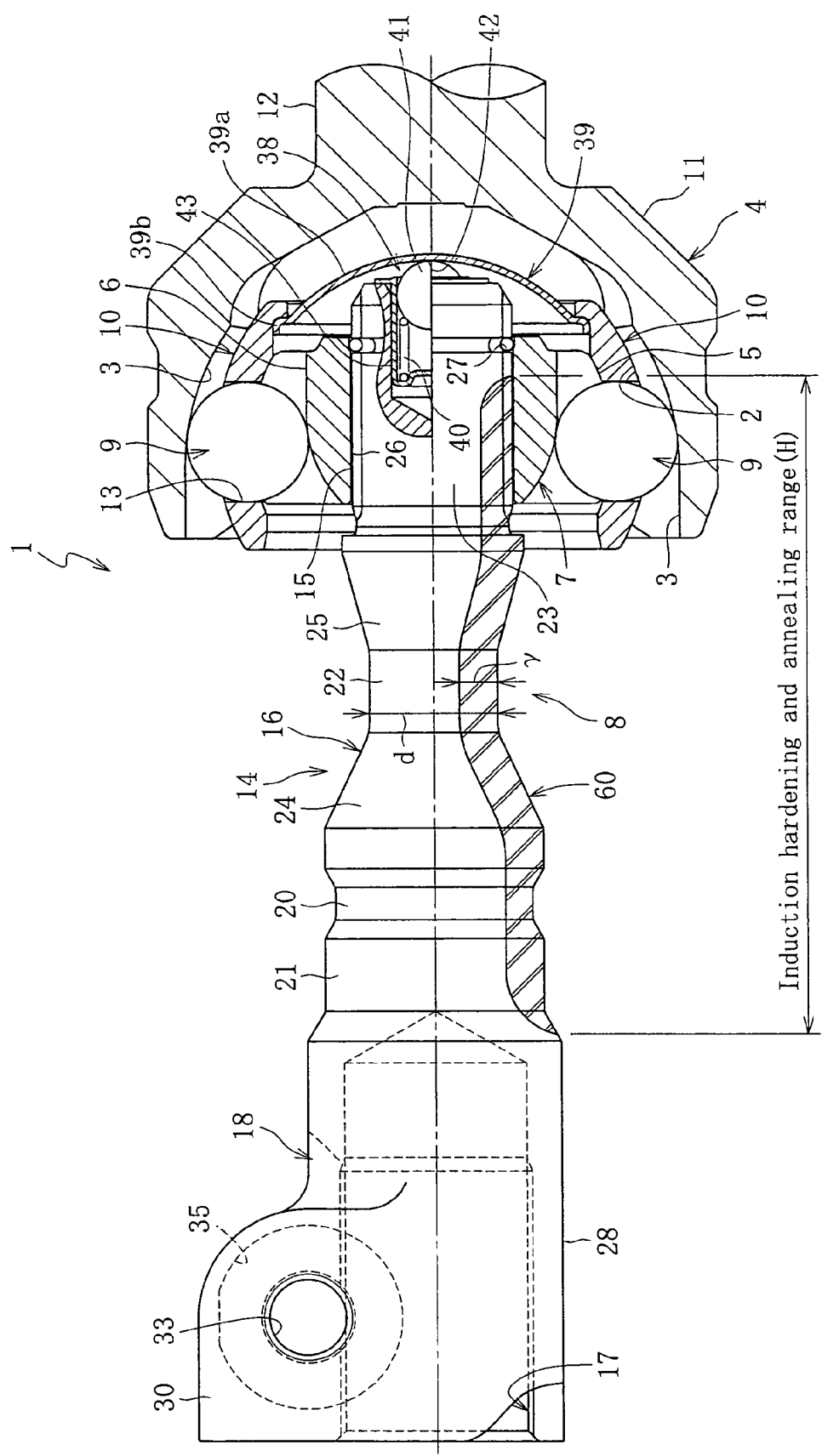
FIG. 1 is an enlarged cross-sectional view showing a constant velocity universal joint including a constant velocity universal joint shaft according to a first embodiment of the present invention.

FIG. 1 depicts an entirety of a constant velocity universal joint shaft according to a first embodiment of the present invention. A constant velocity universal joint 1 used with the constant velocity universal joint shaft 14 includes an outer member 4 with a plurality of raceways 3 formed on an inner diametral surface (spherical inner surface) 2, an inner member 8 including an inner race 7 with a plurality of raceways 6 formed on an outer diametral surface (spherical outer surface) 5, a ball 9 located in each of a plurality of ball tracks formed by collaboration of the raceway 3 of the outer member 4 and the raceway 6 of the inner member 8, and a retainer 10 including a plurality of ball pockets 13 that retain the balls 9 circumferentially aligned at a predetermined interval.

The outer member 4 includes a cup-shaped outer race 11 with the raceway 3, and a shaft 12 projecting from the bottom wall of the outer race 11. The inner member 8 includes the inner race 7 accommodated inside the outer race 11, such that the shaft 14 is fitted to the inner race 7. The shaft 14 includes a shaft body 16 with a spline 15 that fits the inner race 7, and a yoke portion 18 with a ring-shaped fitting portion 17, and the shaft body 16 and the yoke portion 18 are integrally formed.

The shaft body 16, projecting from the yoke portion 18, includes a major diameter portion 21 with a circumferential groove 20 formed along an outer circumferential surface thereof a minor diameter portion 22 formed in an axially central portion, and a spline portion 23 where the spline 15 is formed.

Between the major diameter portion 21 and the minor diameter portion 22, a tapered portion 24 is provided, where the outer diameter of the tapered portion 24 is gradually reduced toward the spline portion 23. Between the minor diameter portion 22 and the spline portion 23, a tapered portion 25 is provided, where the outer diameter of the tapered portion 25 is gradually increased toward the spline portion 23.

As stated earlier, the spline portion 23 includes the spline 15 formed on the outer circumferential surface. The inner circumferential surface of the inner race 7 includes a spline 26 that fits the spline 15 of the shaft body 16. The spline portion 23 includes a ring groove 27 formed within the axial range of the spline 15. A snap ring (not shown) is attached to the ring groove 27, thus achieving a lock structure upon fitting the shaft body 16 to the inner race 7. Here, the splines 15, 26 include axial ridges (protruding teeth) circumferentially aligned at a predetermined pitch, and axial grooves (recessed teeth) formed between the axial ridges.

Figure 2:
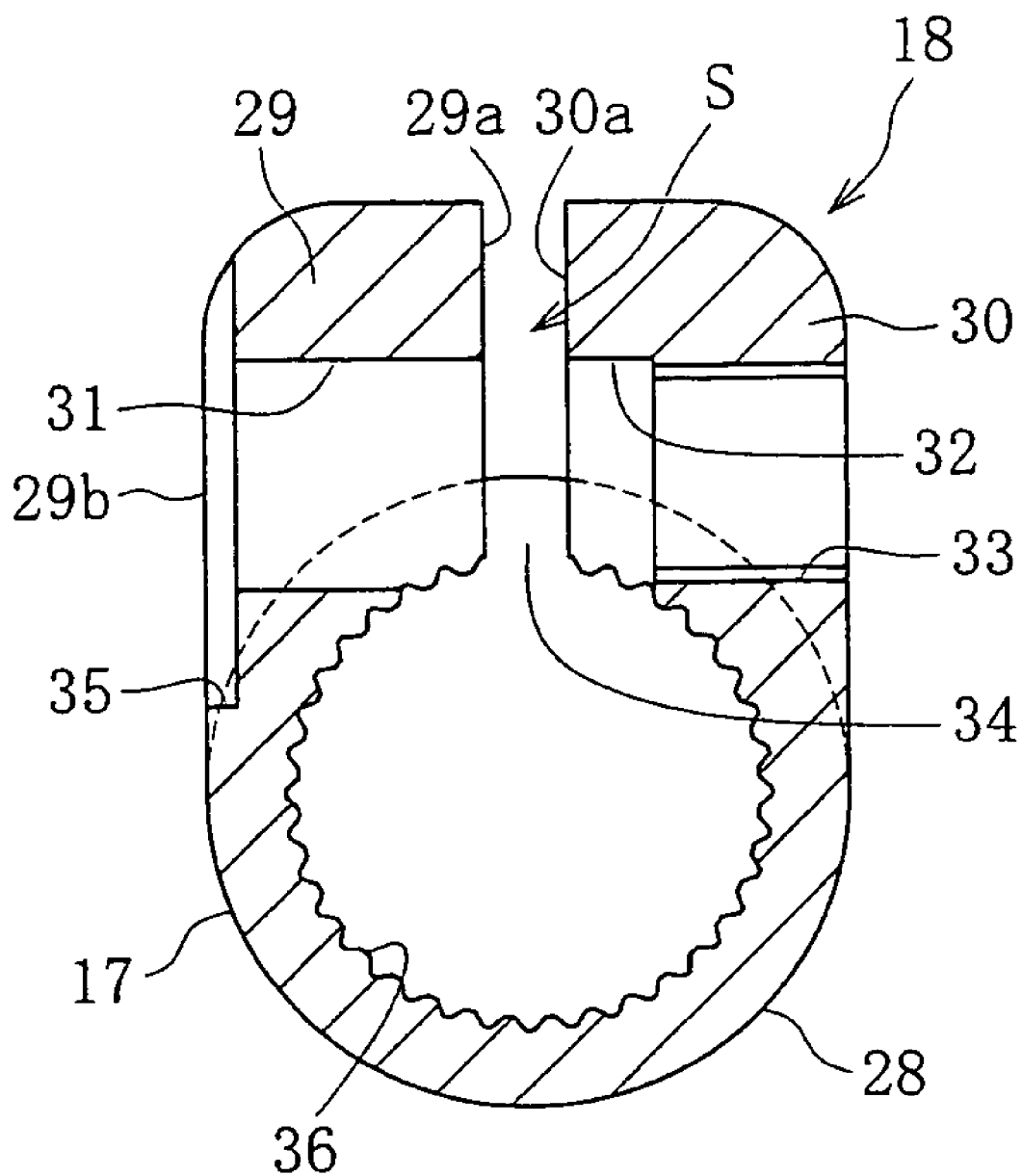
FIG. 2 is a cross-sectional view showing a yoke portion of the constant velocity universal joint shaft.

The yoke portion 18 includes a cylindrical main body 28, and a pair of fastening pieces 29, 30 projecting from the cylindrical main body 28 along its outer diameter, as shown in FIGS. 1 and 2. One of the fastening pieces 29 has a through hole 31, and the other fastening piece 30 has an opening 32 opposing the mating fastening piece 29 and a threaded hole 33 communicating with the opening 32 and opening on the opposite side.

The pair of fastening pieces 29, 30 is disposed such that the respective inner surfaces 29a, 30a oppose each other with a predetermined gap S, under a free state. The axial center of the through hole 31 of the fastening piece 29 generally coincides with that of the opening 32 and the threaded hole 33 of the fastening piece 30. Corresponding to the gap S, the cylindrical main body 28 includes an axial slit 34. The fastening piece 29 includes a larger-diameter recess 35 an the outer surface 29b, so as to communicate with the through hole 31.

The cylindrical main body 28 includes, on the inner circumferential surface thereof, a spline 36 having axial ridges (protruding teeth) and axial grooves (recessed teeth) formed between the axial ridges.

The shaft 14 may be formed of a medium carbon steel containing, for example, 0.3% to 0.6% of carbon. The shaft body 16 is subjected to induction hardening an substantially its entire axial length.

For performing the induction hardening, the surface layer is rapidly heated by a high-frequency induction current, after which a coolant is sprayed for quenching and hardening. In this case, it is preferable that $d/4 \leqq \gamma \leqq d/2$ is satisfied, where a depth of the hardened layer (effective hardened layer depth) is denoted by $\gamma$, and a diameter of the minor diameter portion 22 is denoted by d.

It is to be noted that FIG. 1 shows a range of the portion subjected to induction hardening (hardened layer) 60 (induction hardening and annealing range), with a hatching pattern of a different direction. Although only a portion of the outer circumferential surface is shown as the hardened layer 60 in FIG. 1, actually the hardened layer 60 is formed over the entire outer circumferential surface. The benefit of performing induction hardening is an increase in breaking strength. Especially, performing the induction hardening on the medium carbon steel generates a high compressive residual stress, thereby upgrading the fatigue strength. The carbon content that achieves a maximum compressive residual stress is in a range of 0.4% to 0.55%.

The shaft body 16 includes a pressing portion 41 on an end portion thereof that applies an elastic pressing force in an axial direction. The retainer 10 includes an abutment 42 that receives the pressing force applied by the pressing portion 41. At the axial tip portion of the shaft body 16, a pressing member 38 is provided. The pressing member 38 includes a ball that serves as the pressing portion 41, a compressed coil spring that serves as the elastic matter 40, and a case 43 that assembles the pressing portion 41 and the elastic member 40. The elastic member 40 provides an elastic force via the pressing portion 41. The pressing portion 41 may be of a convex spherical shape. The case 43 is fixed to the end face of the shaft body 16 by an appropriate method, such as press-fitting or bonding.

The abutment member 39 is disposed so as to cover a deeper end opening beyond the outer race of the retainer 10. The abutment member 39 includes a spherical portion 39a partially formed in a spherical shape, and an attachment portion 39b annularly formed along the outer circumference thereof. The inner surface (opposing the shaft body 16) of the spherical portion 39a is of a concave spherical shape. The concave spherical portion serves as the abutment 42 that receives the pressing force applied by the pressing portion 41. The attachment portion 39b is fixed to the end portion of the retainer 10 by an appropriate method such as press-fitting or welding. Such structure provides a pressing force that causes the inner race 7 and the retainer 10 to relatively move in the axial direction. Specifically, the pressing force presses the ball 9 into a narrower portion of the wedge-shaped ball track, thus to eliminate the axial gap in each track. As a result, the ball 9 constantly remains in contact with the raceway 3 of the outer member and the raceway 6 of the inner member 8.

In the constant velocity universal joint thus constructed, the yoke portion 18 of the shaft 14 is connected to a shaft external to the joint, such as a steering column shaft or an intermediate shaft. More specifically, the external shaft to be connected, though not shown, also has a spline formed on an outer circumferential surface of an end portion thereof, so that the spline portion of the end portion is inserted into the fitting portion 17 of the yoke portion 18 (i.e. the section corresponding to the fastening pieces of the cylindrical main body 28), and that in such a state the fitting portion 17 is fastened.

For fastening, a screw member (fastening member, not shown) is inserted from the outer surface 29b of one of the fastening pieces 29, through the through hole 31 and the opening 32 of the other fastening piece 30, thus to be thread-fitted with the threaded hole 33 of the latter fastening piece 30.

Since the yoke portion 18 is formed of a medium carbon steel with a carbon content of approx. 0.3% to 0.6%, the fastening pieces 29, 30 gradually come closer to each other as the screw member is fastened, thus reducing the gap of the axial slit 34, and deforming (reducing the diameter of) the fitting portion 17.

The reduction in diameter of the fitting portion 17 causes the spline portion of the external shaft inserted into the fitting portion 17 to be fastened, and to be thereby unified with the yoke portion 18, thus achieving the coupling of the external shaft and the constant velocity universal joint.

As described above, in the constant velocity universal joint shaft 14, the shaft body 16 and the yoke portion 18 that fits a shaft external to the joint are integrally formed, which eliminates the need to separately fabricate the shaft and the yoke and to subsequently couple them. Such a structure allows improvement of the assembly efficiency of the constant velocity universal joint, as well as reduction of the manufacturing cost. Further, since the shaft body 16 and the yoke portion 18 are integrally formed, there is no likelihood of separation of the shaft body 16 and the yoke portion 18, unlike the conventional coupled structure, and a stable strength is achieved. Moreover, the rotational backlash originating from the conventional coupled structure of the yoke portion can be eliminated. The constant velocity universal joint shaft 14, therefore, can be appropriately applied to a steering apparatus of a vehicle, in which the rotational backlash should not occur.

Since the shaft 14 is formed of medium carbon steel with a carbon content of approx. 0.3% to 0.6%, the fitting portion 17 of the yoke portion 18 can be reduced in diameter (fastening deformation). Accordingly, the yoke portion 18 can be securely and tightly connected to a shaft external to the joint, such as a steering column shaft or an intermediate shaft.

Because of the induction hardening performed on the spline portion 23 of the shaft body 16, the spline-fitted portion is stabilized. The region from the spline portion 23 on the shaft body 16 to the minor diameter portion 22 on the shaft body 16 is also subjected to induction hardening, and hence a sufficient strength required by the shaft can be secured, despite the fact that the minor diameter portion 22 is originally inferior in strength. Further, the minor diameter portion 22 serves to avoid an interference with the outer member 4, and hence permits the shaft body 16 to be oriented in a larger operational angle. Also, since the gap between the tracks (axial gap) can be eliminated via the ball 9, a circumferential play (rotational backlash) between the inner race 7 and the outer race 11 can be suppressed.

Figure 3:
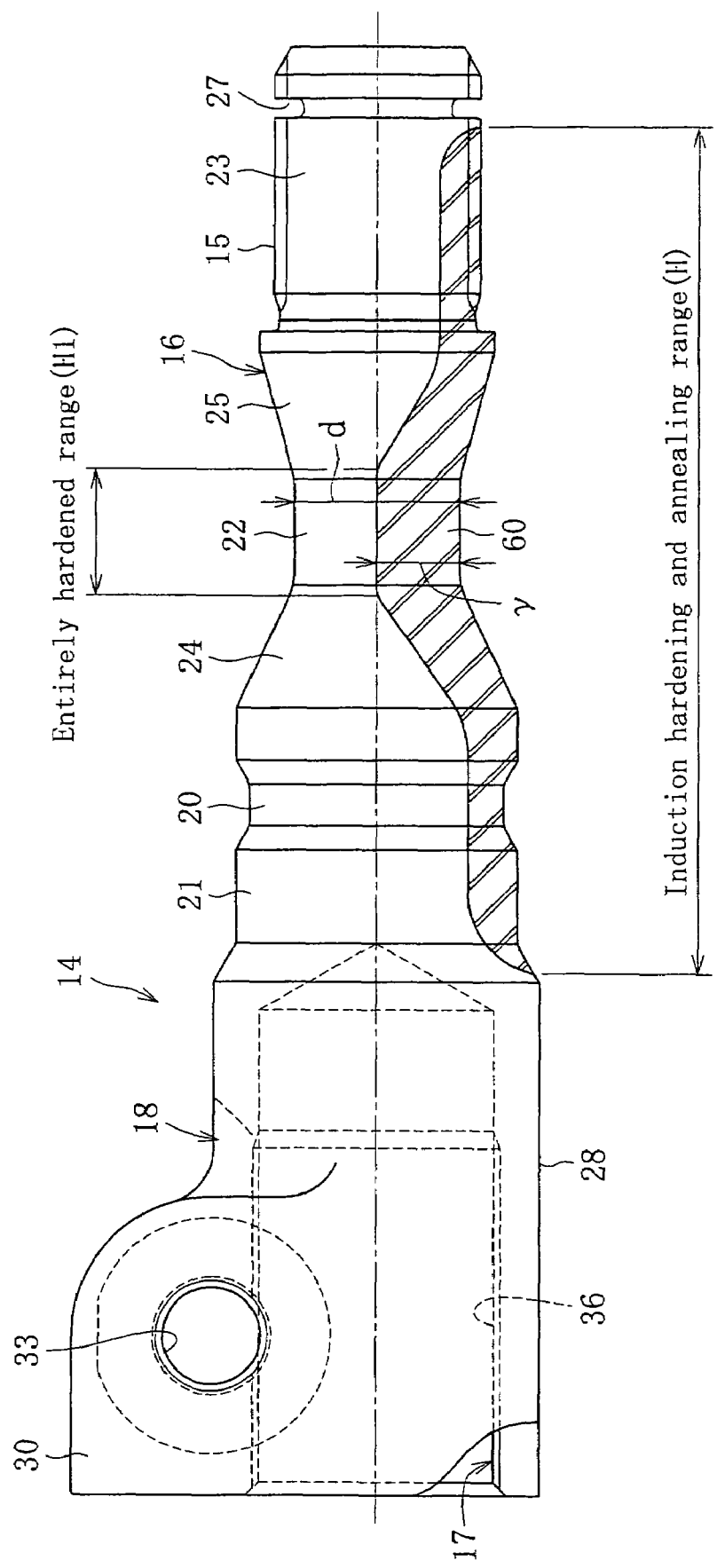
FIG. 3 is a side view showing a constant velocity universal joint shaft according to a second embodiment of the present invention.

FIG. 3 depicts a shaft 14 according to a second embodiment, in which the range of the portion subjected to the induction hardening 60, i.e. the induction hardening and annealing range (hardening range) H covers the substantially an entire axial length of the shaft body 16, as in the first embodiment. In this case, as shown in FIG. 3, the entire radial portion of the minor diameter portion 22 is subjected to induction hardening. In other words, in the hardened layer 60, γ=d/2 is established where a depth of the hardened layer is denoted by y and a diameter of the minor diameter portion 22 is denoted by d. Such an entirely hardened range H1 is formed so as to include a part of the tapered portion 24 and a part of the tapered portion 25. This is because, since a part of each tapered portion 24, 25 is also small in diameter like the minor diameter portion 22, such portions may be inferior in strength unless subjected to induction hardening. The constant velocity universal joint shaft 14 according to the second embodiment also provides similar advantageous effects to those offered by the constant velocity universal joint shaft 14 according to the first embodiment. In particular, since the entire radial portion of the minor diameter portion 22 is hardened, the minor diameter portion 22 can be significantly strengthened, thereby granting a stable strength to the shaft body 16. In the constant velocity universal joint shaft 14 according to the second embodiment, the same constituents as those of the shaft 14 according to the first embodiment are given the identical numerals, and detailed description thereof will be omitted.

Figure 4:
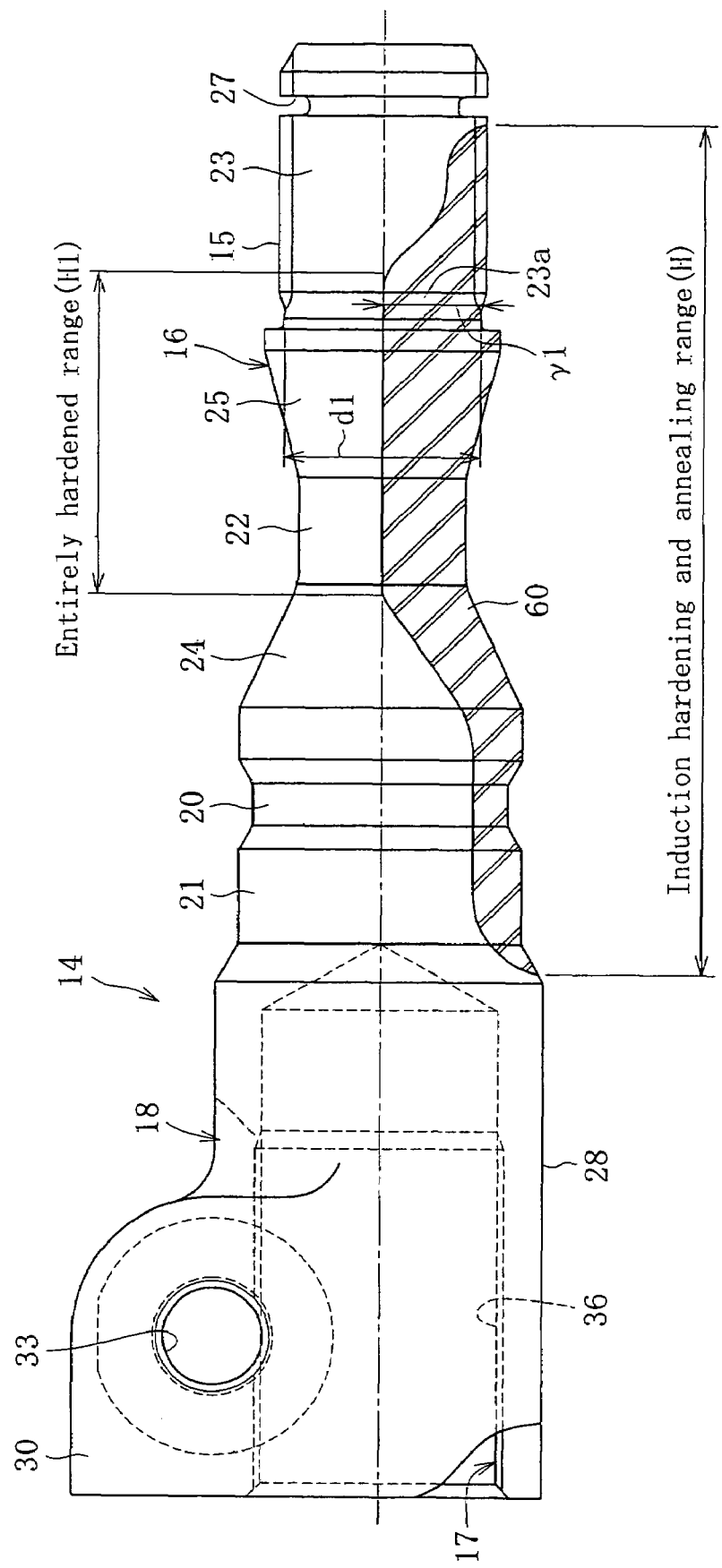
FIG. 4 is a side view showing a constant velocity universal joint shaft according to a third embodiment of the present invention.
Figure 5:
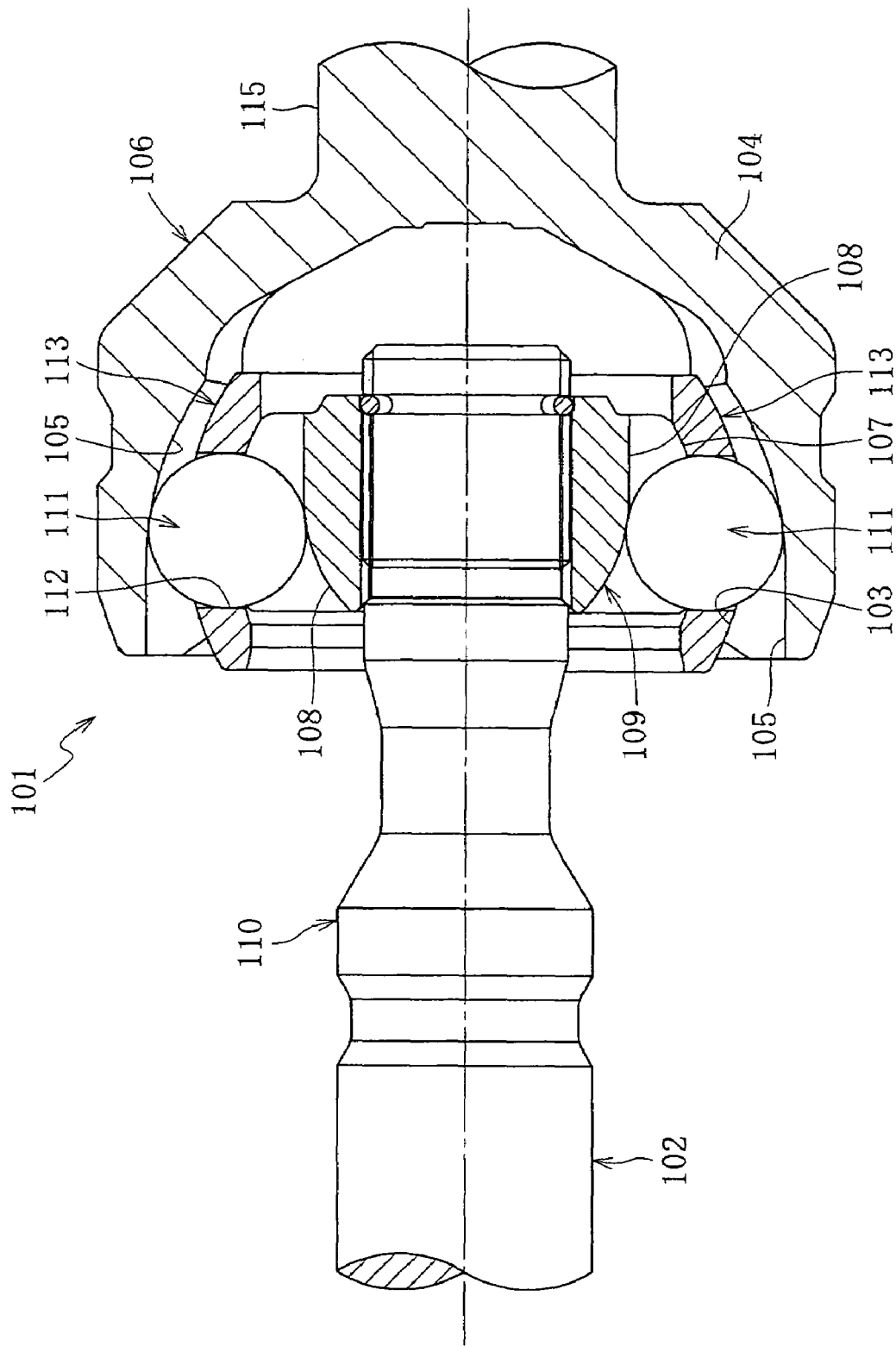
FIG. 5 is an enlarged cross-sectional view showing a constant velocity universal joint including a conventional constant velocity universal joint shaft.
Figure 6:
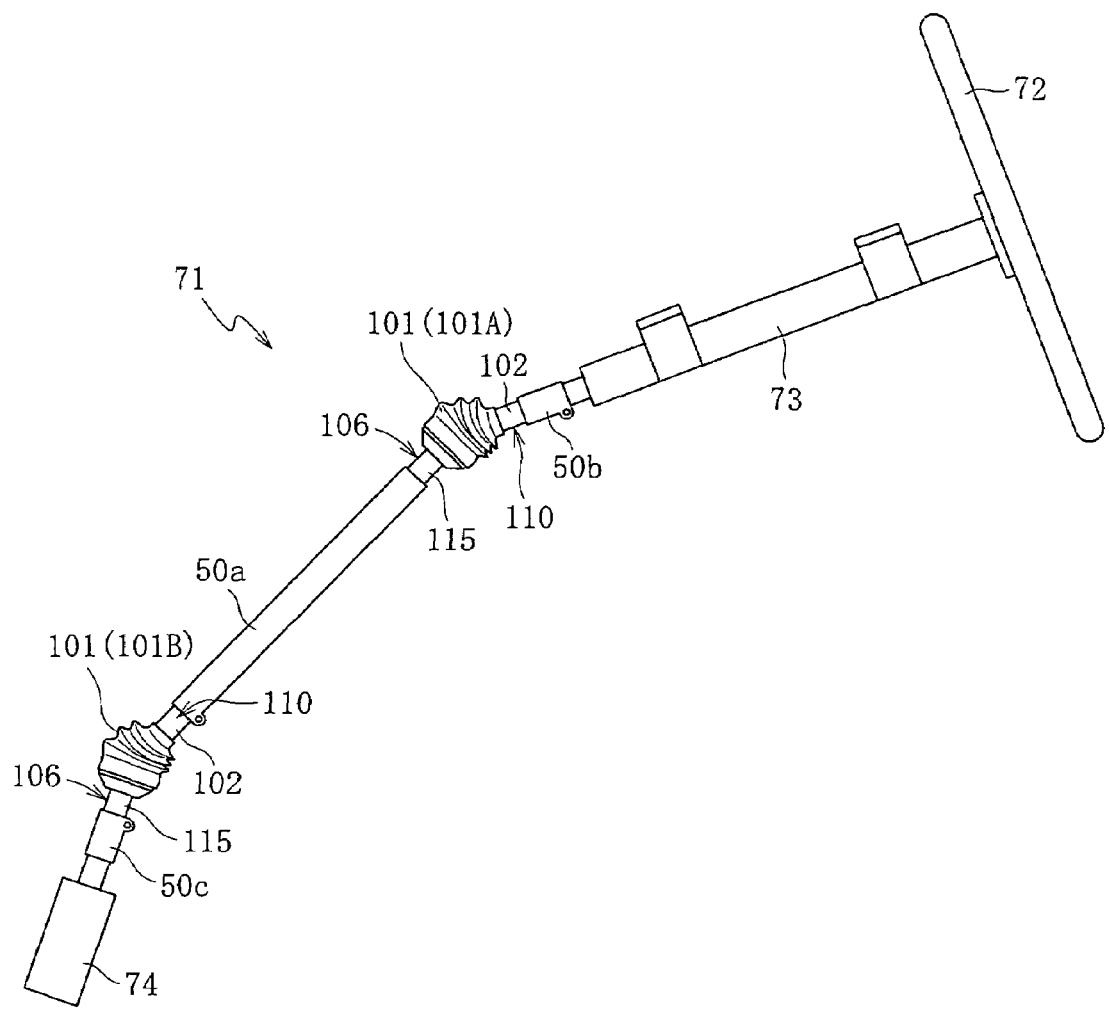
FIG. 6 is a schematic side view showing a steering apparatus.

FIG. 4 depicts a shaft 14 according to a third embodiment. In the constant velocity universal joint shaft 14 according to the third embodiment, the same constituents as those of the shaft 14 according to the first embodiment are given the identical numerals, and detailed description thereof will be omitted. On this shaft 14 also, the induction hardening and annealing range (hardening range) H covers the substantially an entire axial length of the shaft body 16, as in the first embodiment. In this embodiment, the induction hardening is performed so as to achieve $d1/4 \leq \gamma 1 \leq d1/2$, where a depth of the hardened layer (effective hardened layer depth) is denoted by γ1, and a diameter of the base portion 23a of the spline portion 23 is denoted by d1. In this case, the entirely hardened range H1 includes a part of the tapered portion 24, the minor diameter portion 22, the tapered portion 25 and a part (base portion 23a) of the spline portion 23. Accordingly, the constant velocity universal joint shaft 14 according to the third embodiment also provides similar advantageous effects to those offered by the constant velocity universal joint shaft 14 according to the first embodiment. In particular, since the range from the minor diameter portion 22 to a part (base portion 23a) of the spline portion 23 is included in the entirely hardened range, the shaft body 16 acquires a further stabilized strength as a whole.

In FIG. 4, the entirely hardened range H1 on the spline portion 23 only covers the base portion 23a (end portion closer to the yoke portion 18). This is because a great force is applied to this portion when transmitting a torque. The hardened range (induction hardening and annealing range) H formed by the induction hardening covers substantially the entire axial length of the shaft body 16 in the foregoing embodiments, while the induction hardening may be performed only on the spline portion 23 or only on the minor diameter portion 22. Also, it is not imperative to form the minor diameter portion 22 on the shaft body 16. Further, the entire radial portion of the induction hardening and annealing range H may be hardened.

The hardening depth (radial range) of the induction hardening and annealing range H may be appropriately determined according to a material of the shaft 14, a radial dimension or axial length of the minor diameter portion 22 and other portions. Referring to the fastening member, a screw and a nut that thread-fits the screw may be provided, instead of forming the threaded hole 33 on the fastening piece 30.

The invention claimed is:

1. A constant velocity universal joint shaft for use with a constant velocity universal joint, a fastening member, and a shaft external to the joint,
    wherein the constant velocity universal joint includes:
        an outer member with a plurality of first raceways formed on an inner surface thereof;
        an inner member with a plurality of second raceways formed on an outer surface thereof, each second raceway of the plurality of second raceways corresponding to a respective first raceway of the plurality of first raceways;
        a plurality of balls located in respective tracks formed by the plurality of first raceways and the plurality of second raceways;
        a retainer disposed between the outer member and the inner member so as to retain the plurality of balls; and
        an abutment member attached to the retainer,
    said constant velocity universal joint shaft comprising:
        a shaft body formed of a medium carbon steel, said shaft body having a minor diameter portion shaped to avoid interference with the outer member of the constant velocity universal joint;
        a spline provided on said shaft body for fitting to the constant velocity universal joint;
        a pressing member attached to said shaft body;
        an elastic member disposed abutting said pressing member; and
        a yoke portion formed of a medium carbon steel, said yoke portion being formed integrally with said shaft body and having a ring-shaped fitting portion,
    wherein said ring-shaped fitting portion is configured so that a diameter of said ring-shaped fitting portion is reducible by a fastening force applied via the fastening member to fit said ring-shaped fitting portion to the shaft external to the joint,
    wherein said elastic member is configured to elastically abut said pressing member and the abutment member so that each ball of the plurality of balls constantly remains in contact with a first raceway of the plurality of first raceways and a second raceway of the plurality of second raceways,
    wherein said shaft body portion is subjected to an induction hardening process, and
    wherein $d/4 \leq \gamma \leq d/2$ is satisfied, where a depth of a hardened layer formed on said minor diameter portion of said shaft body by said induction hardening is denoted by γ, and a diameter of said minor diameter portion is denoted by d.

2. A constant velocity universal joint shaft for use with a constant velocity universal joint, a fastening member, and a shaft external to the joint,
    wherein the constant velocity universal joint includes:
        an outer member with a plurality of first raceways formed on an inner surface thereof;
        an inner member with a plurality of second raceways formed on an outer surface thereof, each second raceway of the plurality of second raceways corresponding to a respective first raceway of the plurality of first raceways;
        a plurality of balls located in respective tracks formed by the plurality of first raceways and the plurality of second raceways;
        a retainer disposed between the outer member and the inner member so as to retain the plurality of balls; and an abutment member attached to the retainer, said constant velocity universal joint shaft comprising:

a shaft body formed of a medium carbon steel, said shaft body having a minor diameter portion shaped to avoid interference with the outer member of the constant velocity universal joint;

a spline provided on said shaft body for fitting to the constant velocity universal joint;

a pressing member attached to said shaft body;

an elastic member disposed abutting said pressing member; and a yoke portion formed of a medium carbon steel, said yoke portion being formed integrally with said shaft body and having a ring-shaped fitting portion, wherein said ring-shaped fitting portion is configured so that a diameter of said ring-shaped fitting portion is reducible by a fastening force applied via the fastening member to fit said ring-shaped fitting portion to the shaft external to the joint, wherein said elastic member is configured to elastically abut said pressing member and the abutment member so that each ball of the plurality of balls constantly remains in contact with a first raceway of the plurality of first raceways and a second raceway of the plurality of second raceways, wherein said spline portion is subjected to an induction hardening process, and wherein $dl/4 \leq \gamma l \leq dl/2$ is satisfied, where a depth of a hardened layer formed on a base portion of said spline toward said yoke portion is denoted by $\gamma l$, and a diameter of said base portion of said spline is denoted by $dl$.

3. A constant velocity universal joint shaft for use with a constant velocity universal joint, a fastening member, and a shaft external to the joint, wherein the constant velocity universal joint includes:

an outer member with a plurality of first raceways formed on an inner surface thereof;

an inner member with a plurality of second raceways formed on an outer surface thereof, each second raceway of the plurality of second raceways corresponding to a respective first raceway of the plurality of first raceways;

a plurality of balls located in respective tracks formed by the plurality of first raceways and the plurality of second raceways;

a retainer disposed between the outer member and the inner member so as to retain the plurality of balls; and an abutment member attached to the retainer, said constant velocity universal joint shaft comprising:

a shaft body formed of a medium carbon steel, said shaft body having a minor diameter portion shaped to avoid interference with the outer member of the constant velocity universal joint;

a spline provided on said shaft body for fitting to the constant velocity universal joint;

a pressing member attached to said shaft body;

an elastic member disposed abutting said pressing; and a yoke portion formed of a medium carbon steel, said yoke portion being formed integrally with said shaft body and having a ring-shaped fitting portion, wherein said ring-shaped fitting portion is configured so that a diameter of said ring-shaped fitting portion is reducible by a fastening force applied via the fastening member to fit said ring-shaped fitting portion to the shaft external to the joint, wherein said elastic member is configured to elastically abut said pressing member and the abutment member so that each ball of the plurality of balls constantly remains in contact with a first raceway of the plurality of first raceways and a second raceway of the plurality of second raceways, wherein said shaft body portion is subjected to an induction hardening process, wherein $d/4 \leq \gamma \leq d/2$ is satisfied, where a depth of the hardened layer formed on the minor diameter portion of the shaft body by the induction hardening is denoted by $\gamma$, and a diameter of the minor diameter portion by $d$, wherein said spline is subjected to the induction hardening process, and wherein $dl/4 \leq \gamma l \leq dl/2$ is satisfied, where a depth of a hardened layer formed on a base portion of said spline is denoted by $\gamma l$, and a diameter of said base portion of said spline is denoted by $dl$.

\* \* \* \* \*